Patented July 14, 1936

2,047,208

UNITED STATES PATENT OFFICE 2,047,208

PROCESS OF REDUCING TITANIUM SULPHATE LIQUORS

Ignace J. Krchma, Brooklyn, Md., assignor, by mesne assignments, to E. I. du Pont de Nemours and Company, a corporation of Delaware No Drawing. Application September 21, 1934, Serial No. 744,902

11 Claims. (Cl. 23—202)

This invention relates to the reduction of titanium sulphate-iron sulphate solutions and is particularly directed to processes wherein such solutions are reduced by the action of at least two metals which are between calcium and hydrogen in the electromotive series. By using two metals I obtain a great increase in efficiency over the effects attributable to the reducing action of the individual metals.

In the manufacture of titanium oxide from titaniferous ores, such as ilmenite, the ores are treated with sulphuric acid to open them and yield soluble iron sulphates and titanium sulphate. As the ore contains iron in both the ferrous and ferric states, the sulphate solution obtained from the ore likewise contains ferrous and ferric sulphates. The solution also contains, of course, sulphuric acid, titanium sulphate, and minor amounts of the sulphates of other metals. If this solution is heated to produce titanium oxide by hydrolysis of the titanium sulphate, some of the iron will precipitate and contaminate the product. It has been found that if the ferric iron is reduced to the ferrous state prior to hydrolysis, little difficulty is experienced in obtaining a product relatively free from iron.

Various methods for the reduction of the ferric sulphate have been proposed, one being to add metallic iron to the solution. The iron is usually used in the form of cast iron borings, turnings, and the like, and contains a considerable amount of silica and carbon which remain in the solution on dissolution of the iron. These impurities render it difficult to purify and clarify the solution. It is also noted that in practice the iron displays only about fifty to sixty per cent of its theoretical reducing value.

I have found that greater reducing efficiency may be obtained by using two metals. One is selected from the metals electronegative to hydrogen and electropositive to calcium in the electromotive series. I associate with this metal a more electropositive metal. The second metal is selected from the metals more electropositive than aluminum and more electronegative than hydrogen.

I do not fully understand the action which underlies the effects obtained by associating the two metals. It may be that the more electropositive metal acts as a catalyst for the desired reaction. Or, it may be that the the greatly increased efficiency obtained is due to some effect of the metal pair attributable to its action as an electric couple.

Lest some confustion arise, I wish to note at this point that the terminology used herein follows the modern electrochemical usage wherein the electromotive force series of metals is headed by caseium as the most electronegative metal. The list continues until hydrogen is reached as a zero point, and continues below hydrogen with electropositive metals until gold, the most electropositive metal, is reached at the mottom of the series. Thus metals above hydrogen are electronegative and metals below hydrogen electropositive. In the same way, of two metals, the one highest in the series is the more electronegative and the other the more electropositive.

When metal couples, such as those of my invention, are employed to reduce titanium solutions, the more electronegative metals are first entirely utilized in the presence of the more electropositive metals. As the more electronegative metals would replace them in their salts if any formed, the more electropositive metals remain in the metallic state until all of the more electronegative metals are entirely utilized. Thus, taking the specific example of iron as one metal and tin as the more electropositive metal, if the tin should react to form a salt the iron would replace the tin, forming an iron salt and freeing metallic tin.

After the more electronegative metal is used up the more electropositive metal will then act as a reducing agent as it is also above hydrogen. For instance, if iron is selected as one metal and tin is used as a more electropositive metal, the iron will reduce the solution in the presence of the tin until entirely utilized. The tin until it too is exhausted will then act to reduce the solution.

While I usually prefer to use two metals, more may be employed in the same way. For example, I may use such combinations of metals as aluminum-zinc-tin, zinc-cadmium-iron, and magnesium-aluminum-zinc-tin.

In general, I use at least two metals all of which are below calcium and above hydrogen in the electromotive series.

I generally prefer to use a major amount of the most electronegative metal and to use a small, but substantial, amount of more electropositive metals. For example, in a zinc-tin couple it is preferable to use the more electropositive metal in minor amounts for it does not begin to act as a reducing agent until the more electronegative element is exhausted, and then it must act alone and without the benefit of a more electropostive metal. In couples such as zinc-iron-tin it is economically desirable to use a major amount of iron, and although the iron will not begin action as a reducing agent until the zinc is exhausted, the tin remains to increase the efficiency of the iron.

Generally I prefer to add the metals in a closely associated form, tho each should retain its identity and be present as a discrete mass. The metals may, for instance, be coated upon each other, or they may be used in the form of closely juxtaposed strips. Again, they may be powdered and mixed for use, and, if desired, the powdered mixture may be caused to partly coalesce by pressure or high temperatures. But in any event the mass should be heterogeneous, and the metals should be present as discrete particles. The specific manner of association is a matter which may be widely varied without losing the benefits of my invention. It is only necessary that all the metals be exposed to the solution to be treated and be as closely associated as is practical.

While an efficient reduction may be accomplished, as above set forth, by the use of metals between calcium and hydrogen in the electromotive series, I prefer, for various practical reasons, to use certain of the more desirable metals. Manganese, chromium, cadmium, cobalt, etc., for instance, may tend, even in very minute amounts, to impair the color of the product. The metals which I consider especially desirable are magnesium, aluminum, zinc, iron, and tin.

The most practical, desirable, and efficient of my reducing agents is an iron-tin couple. As an iron-tin couple I preferably use tin scrap, an inexpensive by-product of the tin plate article manufacture, which consists of relatively pure iron coated with tin. In addition to its low cost, tin scrap is especially desirable as it leaves much less insoluble residue than do the iron borings or turnings customarily used heretofore.

When tin scrap is used for the reduction of iron sulphate-titanium sulphate solutions a much higher efficiency is obtained than when iron is used alone. For instance, a typical attack mass of the following composition was treated with first one and then the other:

|  | Percent. |
|---|---|
| $TiSO_4$ | 38.0 |
| $FeSO_4$ | 22.8 |
| $Fe_2(SO_4)_3$ | 14.0 |
| Free $H_2SO_4$ | 12.8 |
| Slimes and undissolved ilmenite | 4.0 |

At temperatures of about sixty to eighty degrees centigrade, about two and seven-tenths pounds of iron was required per hundred pounds of attack mass and about two and five-hundredths pounds of tin scrap was required for an equal quantity of attack mass.

The difference in the action of iron and tin scrap was discernible by a mere inspection of the solution undergoing treatment; the iron causing a rather great evolution of hydrogen, the tin scrap causing no apparent evolution of hydrogen.

My improved reducing agents may be used in the same way as iron and similar agents have been used in the past. While I have shown a number of illustrative examples I do not intend to be limited thereby, the scope of my invention appearing in the following claims.

I claim:

1. In a process of reducing a titanium sulphate-iron sulphate solution, the step comprising subjecting the solution to the action of two metals in discrete form, the metals being between hydrogen and calcium in the electromotive series.

2. In a process of reducing a titanium sulphate-iron sulphate solution, the step comprising subjecting the solution to the action of two metals in discrete form, the metals being between calcium and hydrogen, and the more electronegative metal being present in major amount.

3. In a process of reducing a titanium sulphate-iron sulphate solution, the step comprising subjecting the solution to the action of at least two metals in discrete form, the metals being selected from the group consisting of magnesium, aluminum, zinc, iron, and tin.

4. In a process of reducing a titanium sulphate-iron sulphate solution, the step comprising subjecting the solution to the action of at least two metals in discrete form, the metals being selected from the group consisting of magnesium, aluminum, zinc, iron, and tin the more electronegative metals being present in major amount.

5. In a process of reducing a titanium sulphate-iron sulphate solution, the step comprising subjecting the solution to the action of two metals in discrete form, the metals being selected from the group consisting of magnesium, aluminum, zinc, iron, and tin.

6. In a process of reducing a titanium sulphate-iron sulphate solution, the step comprising subjecting the solution to the action of an iron-tin couple.

7. In a process of reducing a titanium sulphate-iron sulphate solution, the step comprising subjecting the solution to the action of an iron-tin couple, the iron being present in major amount.

8. In a process of reducing a titanium sulphate-iron sulphate solution, the step comprising subjecting the solution to the action of an iron-tin couple, the iron being coated with a minor amount of tin.

9. In a process of reducing a titanium sulphate-iron sulphate solution, the step comprising subjecting the solution to the action of tin scrap.

10. In a process of reducing a titanium sulphate-iron sulphate solution by the use of a metal more electropositive than calcium and more electronegative than hydrogen, the step comprising effecting the reduction in the presence of a second metal more electronegative than hydrogen and more electropositive than the first mentioned metal, whereby the reducing efficiency of the said first mentioned metal is increased.

11. In a process of reducing a titanium sulphate-iron sulphate solution by the use of metallic iron, the step comprising effecting the reduction in the presence of tin whereby the reducing efficiency of the iron is increased.

IGNACE J. KRCHMA.